March 4, 1924.
J. H. McDONOUGH ET AL
CLEANER FOR COTTON
Filed March 21, 1923 — 2 Sheets-Sheet 1
1,485,401
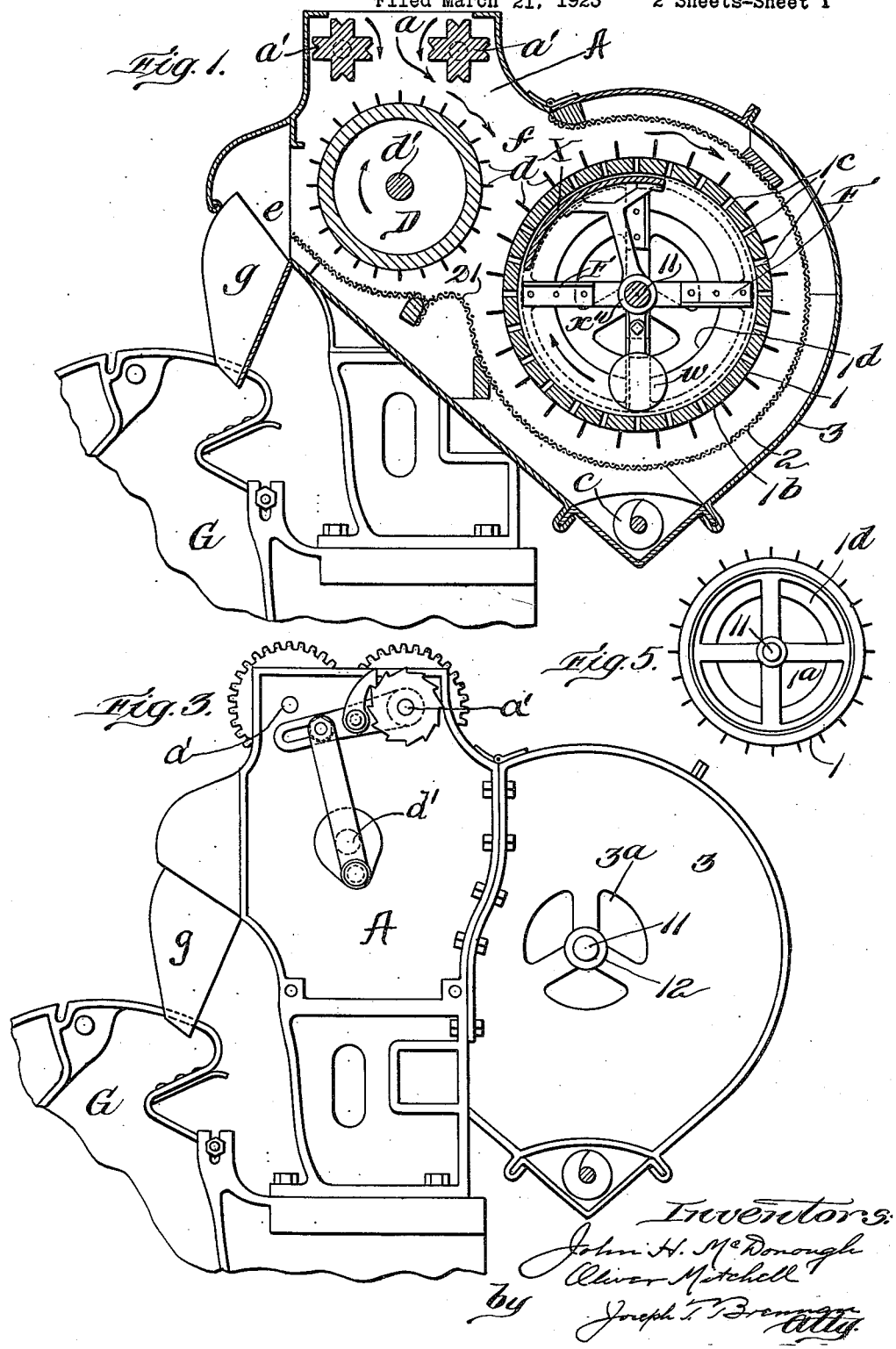

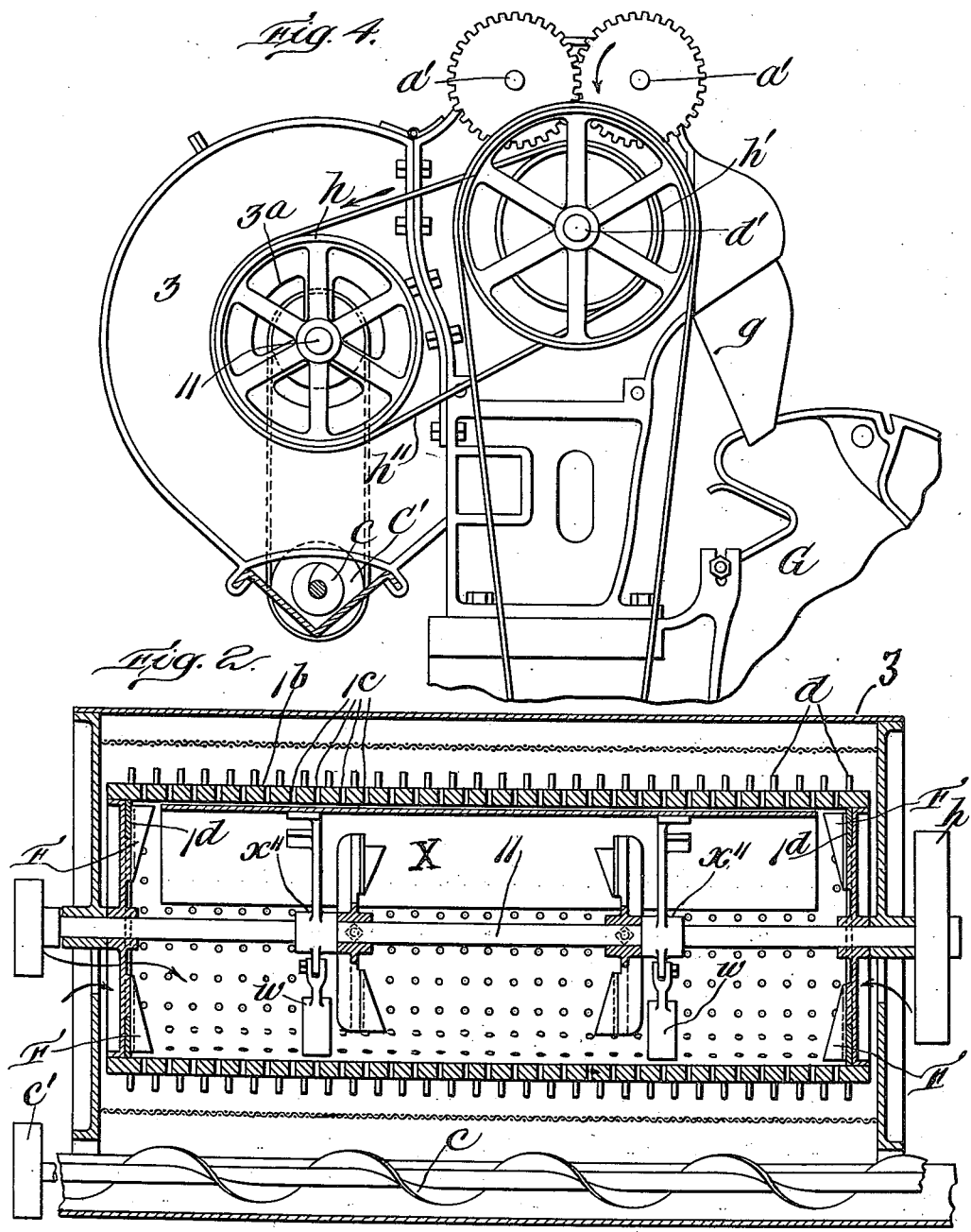

Patented Mar. 4, 1924.

1,485,401

UNITED STATES PATENT OFFICE.

JOHN H. McDONOUGH, OF DALLAS, TEXAS, AND OLIVER MITCHELL, OF BROOKLINE, MASSACHUSETTS, ASSIGNORS TO THE MURRAY COMPANY, OF DALLAS, TEXAS, A CORPORATION OF TEXAS.

CLEANER FOR COTTON.

Application filed March 21, 1923. Serial No. 626,530.

*To all whom it may concern:*

Be it known that we, JOHN H. McDONOUGH and OLIVER MITCHELL, citizens of the United States, residing at Dallas, in the county of Dallas and State of Texas, and Brookline, in the county of Norfolk and State of Massachusetts, respectively, have invented certain new and useful Improvements in Cleaners for Cotton, of which the following is a specification.

Our invention is a beater drum, especially adapted for use in cotton cleaners, and consists in providing a hollow open-end beater drum for such a mechanism, having perforations in the peripheral walls or surface, of the drum and also in providing such a drum with skirts or flanges at the ends and also with fan blades within the drum and actuated therewith, all to actuate air within the drum as it rotates, and cause the air to discharge through the perforations.

In the drawings:

Figure 1 is a cross-sectional elevation of a feeder cleaner embodying my invention;

Figure 2 is a central longitudinal sectional view of the auxiliary drum, on line 2—2 of Figure 1;

Figure 3 is an end elevation of the machine showing the air opening in the casing;

Figure 4 is an end elevation of the machine, showing the driving mechanism;

Figure 5 is an end elevation of the beater drum, on a reduced scale.

The operation of the feeder-cleaner for gins is well known in the art and need not be described at length.

In Figure 1 is shown a feeder-cleaner, consisting of drum D having a multiplicity of spikes or teeth, $d$. This drum is set beneath a pair of feed rolls, $a'$, mounted above the drum, D, in a passage, $a$, of casing A. The drum D and the feed rolls $a'$ rotate as indicated by the arrows. The shaft $d'$ of the drum D and the feed rolls $a'$ are provided with pulleys and gears, outside the casing, by means of which they are actuated from a source of power, all as is well known.

To one side of the drum D is arranged an auxiliary drum or drums, 1, within a screened casing 2, 3, the screen being indicated by 2 and the casing by 3. Drum 1 is carried by shaft 11 mounted in bearings 12 in the sides or ends of casing 3. The ends of drum 1 are open ended as at $1^a$, and the peripheral walls $1^b$ of the drum are perforated as at $1^c$.

When the open end, perforated drum is rotated, in operation, the air within the drum is frictionally rotated therewith and is condensed at the inner surface of the drum and attenuated at the axis of the drum. Air consequently escapes from the drum through the perforations $1^c$ and enters the drum axially at the open ends, $1^a$.

To increase this action we provide the drum at its ends with the inwardly extending flanges or skirts, $1^d$, which, in operation, restrain any escape of air from the ends of the drum at the inner surface and restrain also the entrance of air except at the opening, $1^a$. In practice, we form in the casing, opposite the drum opening, $1^a$, an opening $3^a$ around the bearings 12, to admit the easy entrance of air at this point, to the interior of the casing and drum.

To further increase the action we may employ fan blades, F, rotating around the shaft 11. The face of these blades may be parallel to the axis of the drum and shaft or, preferably, the free ends of the blades may be turned somewhat from across the direction of rotation, to partially face away from the ends of the drum and actuate the air toward the interior of the drum as well as to the inner periphery of the drum.

Our invention is applicable to the feeder drum D, or any other drum, but is shown only as applied to an auxiliary drum, 1.

The drums are connected to rotate in unison by suitable pulleys $h$ and $h'$ and belt $h''$ and a screw conveyor, $c$, may be mounted beneath the screen, within the casing, and driven by pulley $c'$, to evacuate the dust and dirt removed from the cotton in the cleaning process.

The operation is as follows: The machine being actuated from a source of power, seed-cotton is passed into the feeder-cleaner at, $a$, usually from a cotton chute under which the machine is disposed and the seed cotton is engaged by the rollers, $a'$ $a'$, and slightly compressed into a loose bat. The bat is received by the drum D, turning as indicated by the arrows, Figure 1, and moved by spikes, $d$, against the drum 1, rotating as indicated by arrow, by the spikes, $d$, on which drum 1, the bat is carried around opposite screen 2, which begins, as shown, over the drum 1, and extends to the exit, $e$, of the casing and feeder cleaner. A shield X, preferably covers that portion of the inner surface of the drum 1, which is opposite the throat, $f$, and prevents the discharge of air through the perforations $1^c$ covered by the shield. This shield is mounted upon hubs $x''$ on the shaft 11 and is sustained in the desired position, notwithstanding the rotation of the shaft and drum, by the depending weight, W. Such a shield may be employed with any part of the peripheral surface of the drum from which it is not desired that air should discharge through the perforations.

As soon as the bat, which is deposited on the outer surface of drum 1, passes above the shield, in cases where a shield is employed, air from within the drum is emitted through the perforations $1^c$ beneath the cotton and tends to lift and open and hold it against the screen 2, the air passing through the cotton and the screen, carrying dust and trash from the cotton and moisture, if any. The screen 2 is preferably so spaced from the drum that the cotton cannot be forced by the outwardly moving air, beyond the ends of the spikes, $d$. The cotton is pushed along by the spikes $d$, and held and rubbed against the screens 2, until it reaches point 21, between drums, when the bat passes to drum D, which pushes it to the exit, $e$, and the chute, $g$, from which it passes to the gin, indicated at G.

During this passage of the cotton from inlet to outlet it is held toward the screen 2 either against gravity by the air currents, or by the air currents, aided by gravity when the cotton is below the center of the drum, and the cotton is subjected not only to the cleaning action of the spikes and screen but, as well, the cleaning action of the air passing through the cotton and the screen.

We claim:

1. In a cotton cleaner, a hollow rotary spiked drum, having inwardly extending skirts at its ends to define an axial end opening and having a multiplicity of perforations in its peripheral walls, said drum supported for rotation within a screened casing; that casing, provided with an opening coacting with the opening in the drum, for the passage of air; means to actuate the drum.

2. In a cotton cleaner, a hollow rotary spiked drum, having inwardly extending skirts at its ends to define an axial opening and having a multiplicity of perforations in its peripheral walls, said drum supported for rotation within a screened casing; that casing; fan blades mounted within the drum for rotation about the axis thereof; means to actuate the drum and fan blades.

3. In a cotton cleaner, a hollow rotary spiked drum, having inwardly extending skirts at its ends to define an axial opening and having a multiplicity of perforations in its peripheral walls, said drum supported for rotation within a screened casing; fan blades mounted for rotation within the drum about the axis thereof; a screened casing having an opening coacting with the opening in the drum, for the passage of air; means to actuate the drum and fan blades.

4. In a cotton cleaner, a hollow rotary drum, having an open end and a multiplicity of perforations in its peripheral walls, said drum supported for rotation within a screened casing; that casing; a counter-weighted stationary shield, mounted within the drum, to cover a designed sector of the interior periphery of the drum and check the egress of air through the perforations.

Signed at Dallas, Texas and Boston, Mass., this 14th & 19th days of March, 1923.

JOHN H. McDONOUGH.
OLIVER MITCHELL.